(12) United States Patent
Heiliger et al.

(10) Patent No.: US 8,188,187 B2
(45) Date of Patent: *May 29, 2012

(54) MICROGEL-CONTAINING THERMOPLASTIC ELASTOMER COMPOSITION

(75) Inventors: Ludger Heiliger, Neustadt (DE); Thomas Früh, Mutterstadt (DE); Volker Müller, Philippsburg (DE); Heiko Tebbe, Dormagen (DE); Werner Obrecht, Moers (DE); Robert Hans Schuster, Hannover (DE); Martin Müller, Hannover (DE)

(73) Assignees: LANXESS Deutschland GmbH, Leverkusen (DE); Rhein Chemie Rheinau GmbH, Mannheim (DE)

( * ) Notice: Subject to any disclaimer, the term of this patent is extended or adjusted under 35 U.S.C. 154(b) by 694 days.

This patent is subject to a terminal disclaimer.

(21) Appl. No.: 10/573,333
(22) PCT Filed: Sep. 23, 2004
(86) PCT No.: PCT/EP2004/052288
§ 371 (c)(1),
(2), (4) Date: Jun. 23, 2008
(87) PCT Pub. No.: WO2005/033185
PCT Pub. Date: Apr. 14, 2005

(65) Prior Publication Data

US 2008/0249241 A1    Oct. 9, 2008

(30) Foreign Application Priority Data

Sep. 27, 2003   (DE) .................. 103 45 043

(51) Int. Cl.
| | | |
|---|---|---|
| *C08F 8/00* | (2006.01) | |
| *C08L 9/00* | (2006.01) | |
| *C08L 23/04* | (2006.01) | |
| *C08L 23/10* | (2006.01) | |
| *C08L 25/02* | (2006.01) | |

(52) U.S. Cl. ......... 525/191; 525/232; 525/240; 525/241
(58) Field of Classification Search .................. 525/191, 525/232, 240, 241
See application file for complete search history.

(56) References Cited

U.S. PATENT DOCUMENTS

| | | | |
|---|---|---|---|
| 4,173,556 A | 11/1979 | Coran et al. | 260/30.8 R |
| 4,511,695 A | 4/1985 | Lindner et al. | 525/80 |
| 4,694,042 A | 9/1987 | McKee et al. | 525/66 |
| 4,879,328 A | 11/1989 | Karasawa et al. | 524/109 |
| 5,075,380 A | 12/1991 | Lindner et al. | 525/183 |
| 5,082,732 A | 1/1992 | Ueda et al. | 428/402 |
| 5,112,910 A | 5/1992 | Piejko et al. | 525/84 |
| 5,124,408 A | 6/1992 | Engels et al. | 525/215 |
| 5,237,001 A | 8/1993 | Piejko et al. | 525/66 |
| 5,332,782 A | 7/1994 | Liu et al. | 525/66 |
| 5,395,891 A | 3/1995 | Obrecht et al. | 525/194 |
| 5,536,613 A | 7/1996 | Chang et al. | 430/137 |
| 5,637,407 A | 6/1997 | Hert et al. | 428/474.7 |
| 6,127,488 A | 10/2000 | Obrecht et al. | 525/333.3 |
| 6,133,364 A | 10/2000 | Obrecht et al. | 524/495 |
| 6,184,296 B1 | 2/2001 | Obrecht et al. | 525/232 |
| 6,207,757 B1 | 3/2001 | Obrecht et al. | 525/194 |
| 6,242,534 B1 | 6/2001 | Obrecht et al. | 525/191 |
| 6,372,857 B1 | 4/2002 | Obrecht et al. | 525/332.6 |
| 6,399,706 B1 | 6/2002 | Obrecht et al. | 525/191 |
| 6,423,760 B1 | 7/2002 | Qiao et al. | 522/150 |
| 6,573,346 B1 | 6/2003 | Melchiors et al. | 526/217 |
| 6,579,945 B2 | 6/2003 | Obrecht et al. | 525/192 |
| 6,620,866 B1 | 9/2003 | Obrecht et al. | 524/81 |
| 6,620,886 B2 | 9/2003 | Obrecht et al. | 525/191 |
| 2001/0051685 A1 | 12/2001 | Obrecht et al. | 524/526 |
| 2002/0049282 A1 | 4/2002 | Obrecht et al. | 525/194 |
| 2002/0077414 A1 | 6/2002 | Obrecht | 524/804 |
| 2002/0082364 A1 | 6/2002 | Obrecht et al. | 525/535 |
| 2002/0123564 A1 | 9/2002 | Obrecht et al. | 525/30 |
| 2002/0161119 A1 | 10/2002 | Obrecht et al. | 525/133 |
| 2003/0088036 A1 | 5/2003 | Huang et al. | 525/523 |
| 2006/0252858 A1 | 11/2006 | Obrecht et al. | 524/160 |
| 2006/0254734 A1 | 11/2006 | Hannay et al. | 162/134 |
| 2006/0275690 A1 | 12/2006 | Fessenbecker et al. | 430/137.15 |
| 2006/0275691 A1 | 12/2006 | Fessenbecker et al. | 430/137.15 |
| 2007/0135573 A1 | 6/2007 | Ziser et al. | 525/119 |
| 2007/0232733 A1* | 10/2007 | Ziser et al. | 524/386 |
| 2008/0064768 A1 | 3/2008 | Ziser et al. | 516/98 |

FOREIGN PATENT DOCUMENTS

| | | |
|---|---|---|
| DE | 197 01 487 | 7/1998 |
| DE | 198 26 343 | 12/1999 |
| DE | 199 21 415 | 11/2000 |
| GB | 1078400 | 8/1967 |
| JP | 63 081158 | 8/1988 |
| JP | 02-53803 | 2/1990 |

* cited by examiner

*Primary Examiner* — Nathan M Nutter
(74) *Attorney, Agent, or Firm* — Nicanor A. Kohncke

(57) ABSTRACT

The present invention relates to a composition comprising thermoplastic materials and crosslinked microgels which are not crosslinked by high-energy radiation, processes for its preparation, its use for the production of thermoplastically processable shaped articles and shaped articles produced from the composition.

25 Claims, 4 Drawing Sheets

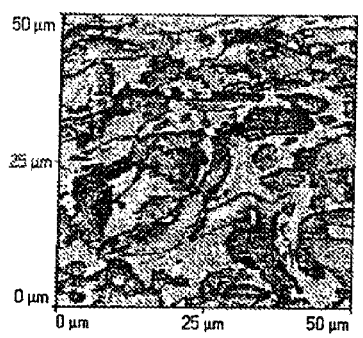 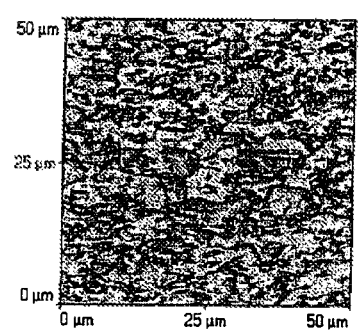
a) without phase mediator        b) with phase mediator
Fig. 3(a)                          Fig. 3(b)

MICROGEL-CONTAINING THERMOPLASTIC ELASTOMER COMPOSITION

CROSS REFERENCE TO RELATED PATENT APPLICATIONS

The present patent application claims the right of priority under 35 U.S.C. §119 (a)-(d) and 35 U.S.C. §365 of International Application No. PCT/EP2004/052288, filed 23 Sep. 2004, which was published in German as International Patent Publication No. WO 2005/033185 on 14 Apr. 2005, which is entitled to the right of priority of German Patent Application No. DE 10345043.2 filed on 27 Sep. 2003.

INTRODUCTION

The present invention relates to a thermoplastic elastomer composition comprising thermoplastic materials and crosslinked microgels which are not crosslinked by high-energy radiation, processes for its preparation, its use for the production of thermoplastically processable shaped articles and shaped articles produced from the thermoplastic elastomer composition.

PRIOR ART

The use of microgels for controlling the properties of elastomers is known (e.g. EP-A-405216, DE-A 4220563, GB-PS 1078400, DE 19701487, DE 19701489, DE 19701488, DE 19834804, DE 19834803, DE 19834802, DE 19929347, DE 19939865, DE 19942620, DE 19942614, DE 10021070, DE 10038488, DE10039749, DE 10052287, DE 10056311 and DE 10061174). The use of CR, BR and NBR microgels in mixtures with rubbers containing double bonds is claimed in the publications EP-A-405216, DE-A-4220563 and in GB-PS-1078400. DE 19701489 describes the use of subsequently modified microgels in mixtures with rubbers containing double bonds, such as NR, SBR and BR.

The use of microgels for the preparation of thermoplastic elastomers is not the doctrine of any of these specifications.

Chinese Journal of Polymer Science, volume 20, no. 2, (2002), 93-98 describes microgels which are completely crosslinked by high-energy radiation and their use for increasing the impact strength of plastics. US 20030088036 A1 similarly discloses reinforced thermosetting resin compositions, for the preparation of which radiation-crosslinked microgel particles are likewise mixed with thermosetting prepolymers (see also EP 1262510 A1). In these publications a radioactive cobalt source is mentioned as the preferred radiation source for the preparation of the microgel particles. Very homogeneously crosslinked microgel particles are obtained by employing radiation crosslinking. However, a disadvantage of this type of crosslinking is, in particular, that a transfer of this process from the laboratory scale into a large-scale industrial installation is not realistic both from economic aspects and from work safety aspects. Microgels which are not crosslinked by high-energy radiation are not used in the publications mentioned. Furthermore, if completely radiation-crosslinked microgels are used, the change in modulus from the matrix phase to the dispersed phase is direct. As a result, under sudden stress tear effects may occur between the matrix and the dispersed phase, whereby the mechanical properties, the swelling properties and the stress corrosion cracking, etc. are impaired.

DE 3920332 discloses rubber-reinforced resin compositions which comprise (i) a matrix resin having a glass transition temperature of at least 0° C. and (ii) 1 to 60 wt. % of rubber particles dispersed in the matrix resin. The dispersed particles are characterized in that they are made of hydrogenated block copolymers of a conjugated diene and a vinylaromatic compound. The particles necessarily have two glass transition temperatures, one being −30° C. or below. The particles have a microphase structure of separate microphases with hard segments and soft segments, in which the hard segments and the soft segments are laminated with one another alternately in the form of concentric multiple layers. The preparation of these specific particles is very expensive, since a solution in organic solvents must first be prepared from the starting substances for the particles (block copolymers). In the second step, water and optionally emulsifiers are added, the organic phase is dispersed in suitable units, the solvent is then stripped off and the particles dispersed in water are then fixed by crosslinking with a peroxide. It is moreover very difficult to produce particle sizes of less than 0.25 µm by this process, which is a disadvantage for the flow properties.

DE 3922103 discloses a process for the preparation of mixtures of thermoplastic polymers in powder form from aqueous emulsions by joint coagulation of a particulate, partly crosslinked rubber-like copolymer and a thermoplastic resin. The partly crosslinked rubber-like copolymers are graft copolymers and have a core-shell structure. They are therefore not random copolymers. Thermoplastic elastomer compositions are not mentioned. The rubber copolymers obtained by this process furthermore are partly crosslinked and have a low crosslinking density, so that the swelling index is relatively high. Such rubber-like copolymers with a low degree of crosslinking have a low dimensional stability when incorporated into thermoplastic resins or thermoplastics and undergo shear, and the fragments combine together to form irregularly shaped heaps. The resulting inhomogeneities lead to defects in the surface of the thermoplastic shaped articles (formation of specks). Such rubber-like graft copolymers with a low degree of crosslinking are therefore disadvantageous.

U.S. Pat. No. 5,536,613 discloses a process for the preparation of a toner composition which comprises a toner resin which is a partly crosslinked thermoplastic resin. However, this publication mentions only thermoplastic particles. No rubber particles are described.

DE 10035493 discloses a process for the preparation of crosslinked rubber particles. DE 10035493 also discloses the use of the crosslinked rubber particles as a filler in rubber and thermoplastics. However, the preparation of thermoplastic elastomer compositions is not described. The use of crosslinked rubber particles as a filler also implies the use of hard microgel particles which have high glass transition temperatures of conventionally above 100° C. and are crosslinked with high amounts of peroxide, so that no thermoplastic elastomers can result.

JP 02053803 similarly describes microgels having a styrene content of at least 70 wt. %, which thus have glass transition temperatures of more than 50° C., that is to say are thermoplastics. Thermoplastic elastomer compositions therefore cannot be formed.

U.S. Pat. No. 4,173,556 describes "elastoplastic" compositions of rubber and polyamide. These compositions are prepared by two different processes. The first process is the process of dynamic vulcanization, as mentioned above. The second process comprises incorporation of the rubber by grinding. The preparation and incorporation of microgels is not described.

OBJECT

Polymer materials can be classified into several groups according to their structural build-up, their mechanical deformation properties and accordingly their properties and fields of use. Traditionally, on the one hand there are the amorphous or partly crystalline thermoplastics which comprise long, non-crosslinked polymer chains. At room temperature, thermoplastics are brittle-hard to viscoelastic. These materials are plastified by pressure and temperature and can be shaped by this means. On the other hand, there are elastomers or rubber materials. Elastomers are a crosslinked rubber product. This can be natural or synthetic rubber. The rubbers can be processed only in the non-crosslinked state. They then have viscoplastic properties. Only when crosslinking chemicals, such as, for example, sulfur or peroxide, are admixed is a vulcanization product or the elastic rubber obtained on subsequent heating. During this "vulcanization operation", the loosely fixed individual rubber molecules are linked chemically to one another by the build up of chemical bonds. As a result, the amorphous precursor, the rubber, is converted into the elastomer with the typical rubber elasticity. The vulcanization operation is not reversible, apart from by thermal or mechanical destruction.

Thermoplastic elastomers (abbreviated to TPEs in the following) show a completely different behaviour. These materials become plastic on heating and elastic again on cooling. In contrast to the chemical crosslinking in elastomers, physical crosslinking exists here. TPEs accordingly are between thermoplastics and elastomers in their structure and in their properties, and they combine the easy processability of thermoplastics with the essential properties of rubber. Above the Tg up to the melting point or up to the softening temperature, TPEs behave like elastomers, but are thermoplastically processable at higher temperatures. By physical crosslinking, for example via (partly) crystalline regions, a thermoreversible structure with elastic properties is formed on cooling.

In contrast to processing of rubber, processing of TPE materials is based not on a cold/hot process but on a hot/cold process. Taking into account the pronounced structural viscosity melting or softening properties, above all in the case of flexible, highly elastic TPE materials, the typical processes of thermoplastics, such as injection moulding, extrusion, hollow articles, blow moulding and thermoforming, can be used for processing TPEs. The properties of the products primarily depend on the structure and the phase morphology; in elastomer alloys e.g. the particle size, the particle size distribution or the particle extension of the disperse phase play a large role. These structural features can be influenced within certain limits during processing. Another essential advantage of TPE materials over the conventional chemically crosslinked elastomers is to be seen in the suitability in principle for recycling. As with all plastics, a degradation in viscosity which increases with the number of processing steps is also found with TPE materials, but nevertheless leads to no significant deterioration in the product properties.

Since the discovery of TPEs, this class of material is distinguished in that it is formed by the combination of a hard phase and a soft phase. The TPEs known to date are divided into two main groups:
  block copolymers and
  alloys of thermoplastics with elastomers.

Block Copolymers:

The composition of the co-monomers determines the ratio of hard phase to soft phase, and determines which phase is the matrix and what the final properties are. A true morphology is detectable at the molecular level if, for example, the component in deficit aggregates or crystallizes. A problem with these materials is the temperature-dependence of this physical fixing of the morphology, i.e. there is a limit temperature at which the fixing of the morphology ceases. This can cause problems during processing due to associated changes in the properties.

Block polymers include, for example, styrene block copolymers (TPE-S), such as butadiene (SBS), isoprene (SIS) and ethylene/butylene (SEBS) types, polyether/polyamide block copolymers (TPE-A), thermoplastic copolyesters, polyether-esters (TPE-E) and thermoplastic polyurethanes (TPE-U), which are described in still more detail below in connection with the starting materials which can be used according to the invention.

The second main group of the TPE material are the elastomer alloys. Elastomer alloys are polymer blends or mixtures which contain both thermoplastic and elastomer contents. They are prepared by "blending", i.e. intensive mixing of the raw materials in a mixing apparatus (internal mixer, extruder or the like). The most diverse mixing ratios between the hard phase and the soft phase may occur. The soft phase can be both non-crosslinked (TPE-0) and crosslinked (TPE-V). In the ideal TPE blend, small elastomer particles which are uniformly distributed in fine dispersion in the thermoplastic matrix are preferred. The finer the distribution and the higher the degree of crosslinking of the elastomer particles, the more pronounced the elastic properties of the resulting TPE. These TPE blends are prepared, for example, by so-called "dynamic vulcanization" or reactive extrusion, in which the rubber particles are crosslinked "in situ" during the mixing and dispersing process (see e.g. U.S. Pat. No. 5,013,793). The properties profile of these blends accordingly depends considerably on the content, on the degree of crosslinking and on the dispersion of the rubber particles. The most diverse combinations can be prepared by this blend technology. In this context, the physico-mechanical properties and also the chemical resistance and compatibility with respect to contact media are substantially determined by the individual properties of the blend components. Certain physical properties can be improved by optimization of the "blend quality" and the degree of crosslinking. Nevertheless, it is a characterizing feature of this class that the dispersed phase is irregularly shaped and in coarsely disperse form. The less compatible the polymers, the coarser the structure formed. The non-compatible combinations, such as, for example, a dispersed phase of NBR rubber in a PP matrix, are of industrial interest in particular. In order to improve the compatibility in these cases and thus to influence in the desired manner the final properties of the material formed, a homogenizing agent can be added before the dynamic vulcanization. About 1% of the homogenizing agent is sufficient for many cases of use. The homogenizing agents are as a rule based on block co-polymers in which the blocks are in each case compatible with one of the blend phases. Both phases here can be either the continuous or the discontinuous phase, depending on the ratios of amounts. It was not hitherto possible to adjust the morphology of this material reliably. Large amounts of the homogenizing agent, where appropriate, are necessary to produce particularly finely divided dispersed phases, but these in turn adversely influence the limit properties of the final material. Industrially prepared and commercially obtainable thermoplastic vulcanization products show a maximum of the distribution of the diameter of the dispersed phase at between 2 µm and 4 µm, with individual volume elements up to 30 µm.

Among the elastomer alloys, the most usual combinations are based on EPDM with PP. Further elastomer alloys are based on NR/PP blends (thermoplastic natural rubber), NBR/PP blends (NBR=acrylonitrile/butadiene rubber), IIR (XIIR)/PP blends (butyl or halobutyl rubbers as elastomeric phase constituents), EVA/PVDC blends ("Alcryn" blend of ethylene/vinyl acetate rubber (EVA) and polyvinylidene chloride (PVDC) as the thermoplastic phase) and NBR/PVC blends. However, because of the "in situ" formation of the dispersed phase and the large number of parameters involved here, a targeted adjustment of the morphology of the dispersed phase and therefore a targeted adjustment of the desired properties of the TPEs in these polymer blend TPEs is practically impossible.

The present inventors therefore had the object of discovering new compositions having thermoplastic elastomer properties which can easily be prepared from starting materials which are known per se and the properties of which can be adjusted in a simple and foreseeable manner. It should be possible to prepare the new compositions on a large industrial scale and they should present no work safety problems. Furthermore, no tear effects between the matrix and dispersed phase such that the mechanical properties, the swelling properties and the stress corrosion cracking, etc. are impaired should occur in the compositions under sudden stress. The preparation of the microgels for the composition should be simple and allow the particle size distributions of the microgel particles to be adjusted in a controlled manner down to very small average particle sizes.

DESCRIPTION OF THE INVENTION

The inventors have found, completely surprisingly, that it is possible to provide compositions having a novel combination of properties by incorporation of crosslinked microgels which are based on homopolymers or random copolymers and are not crosslinked by high-energy radiation into thermoplastic materials. By providing the new composition, surprisingly, it has been possible by this means to overcome the abovementioned disadvantages of the known conventional thermoplastics and TPEs and at the same time to provide thermoplastic elastomer compositions with outstanding use properties. Since thermoplastic elastomer compositions are obtained by incorporation of microgels into thermoplastic materials, it is possible to disengage the adjustment of the morphology of the dispersed phase from the preparation of the TPE material spatially and with respect to time. The establishment of the morphology can be reliably reproduced since the dispersed phase is a microgel, the morphology of which can be controlled in a known manner during the preparation, and which substantially no longer changes during incorporation into the thermoplastic material. In the compositions prepared according to the invention, the polymer microstructure both of the dispersed phase and of the continuous phase can be varied within wide limits, so that tailor-made TPEs can be prepared from any desired thermoplastic materials, which was not possible by the processes to date for the preparation of the conventional TPEs. By controlling the degree of crosslinking and the degree of functionalization in the surface and in the core of the dispersed microgels, the desired properties of the resulting TPEs can be controlled further. The glass transition temperature of the dispersed microgel phase can also be adjusted in a controlled manner within the limits of −100° C. to below 50° C., as a result of which in turn the properties of the resulting TPEs can be adjusted in a controlled manner. The difference in glass transition temperatures between the dispersed phase and the continuous phase can thereby also be adjusted in a controlled manner and can be, for example, between 0° C. and 250° C. With the new class of TPEs provided by the invention, it is moreover also possible to combine thermodynamically compatible and thermodynamically incompatible polymers to give new TPEs which were not accessible by the conventional processes. In the new TPEs provided by the invention, the dispersed phase and the continuous phase can in each case be the hard phase and the soft phase. By controlling the properties of the microgels and the ratios of amounts, the dispersed phase can be present in the matrix in aggregated clusters or uniform distribution and in all intermediate forms.

This is not possible in the case of the TPEs prepared by conventional processes, in which the dispersed phase is formed "in situ" during the preparation of the TPEs.

Furthermore, the inventors have found, surprisingly, not only that thermoplastic elastomers can be prepared by incorporation of microgels into thermoplastics, but that by incorporation of microgels into, for example, thermoplastic elastomers prepared by conventional processes, the properties thereof, such as e.g. dimensional stability and transparency, can be improved in a controlled manner.

The compositions according to the invention can be prepared on an industrial scale by a simple process, without the use of microgels crosslinked by high-energy radiation. The microgels used according to the invention allow a less direct change in modulus between the matrix phase and the dispersed phase, which leads to an improvement in the mechanical properties of the composition.

It is particularly surprising that when thermoplastic elastomers are used as component (A), the physical properties, such as, for example, transparency and resistance to oils, can be improved by incorporation of the microgels (B) prepared according to the invention.

The present invention thus provides a thermoplastic elastomer composition which comprises at least one thermoplastic material (A) and at least one microgel (B) which is based on homopolymers or random copolymers and is not crosslinked by high-energy radiation.

Microgel or Microgel Phase (B)

The microgel (B) used in the composition according to the invention is a crosslinked microgel based on homopolymers or random copolymers. The microgels used according to the invention are therefore crosslinked homopolymers or crosslinked random copolymers. The terms homopolymers and random copolymers are known to the expert and are explained, for example, in Vollmert, Polymer Chemistry, Springer 1973.

The crosslinked microgel (B) used in the composition according to the invention is a microgel which is not crosslinked by high-energy radiation. High-energy radiation expediently means here electromagnetic radiation having a wavelength of less than 0.1 μm.

The use of microgels completely homogeneously crosslinked by high-energy radiation is a disadvantage, because it practically cannot be implemented on a large industrial scale and presents work safety problems. Furthermore, tear effects between the matrix and dispersed phase, as a result of which the mechanical properties, the swelling properties and the stress corrosion cracking, etc. are impaired, occur under sudden stress in compositions which have been prepared using microgels which are completely homogenously crosslinked by high-energy radiation.

The primary particles of the microgel (B) which are contained in the composition according to the invention preferably have an approximately spherical geometry. According to DIN 53206:1992-08, primary particles are the microgel particles dispersed in the coherent phase which can be detected as individuals by suitable physical methods (electron microscope) (cf. e.g. Römpp Lexikon, Lacke und Druckfarben, Georg Thieme Verlag, 1998). An "approximately spherical" geometry means that the dispersed primary particles of the microgels substantially form a circular area detectable when a thin section is viewed with an electron microscope (cf. e.g. FIG. 1). The compositions according to the invention thereby differ considerably from the dispersed phases produced by the "in situ" processes, which are in general larger and have an irregular shape (cf. e.g. FIG. 3). The microgel particles dispersed according to the invention retain their substantially uniform spherical shape resulting from the separate preparation process for the microgels practically without change on dispersion in the thermoplastic material. A simple differentiation between the microgel-containing compositions according to the invention and conventionally prepared TPEs is easily possible with the aid of this criterion. In the TPEs prepared conventionally, the dispersed phase has no uniform morphology, and for this reason no individualized primary particles can be located there.

All known TPEs, in particular TPE-Us or TPE-As, e.g. can be used as the continuous phase in the compositions according to the invention. The heat distortion point of the TPEs, in particular of the TPE-Us or TPE-As, can be improved in a completely surprising manner by incorporation of the microgels (B) into the known TPEs, in particular TPE-Us or TPE-As. In particular, the transparency of the microgel-containing compositions according to the invention based on TPE-U or TPE-A is also improved. The known TPE-Us are not transparent, while the microgel-containing compositions according to the invention based on TPE-U are transparent. By incorporation of the microgels into TPE-As, for example, in addition to the optical properties thereof, such as transparency, their resistance to oils surprisingly can be greatly improved.

In the primary particles of the microgel (B) which are contained in the composition according to the invention, the deviation of the diameters of an individual primary particle, defined as $$[(d1-d2)/d2] \times 100,$$

wherein d1 and d2 are any two desired diameters of any desired section of the primary particle and d1 is >d2, is preferably less than 250%, more preferably less than 200%, even more preferably less than 100%, even more preferably less than 50%.

Preferably, at least 80%, more preferably at least 90%, even more preferably at least 95% of the primary particles of the microgel have a deviation of the diameters, defined as $$[(d1-d2)/d2] \times 100,$$

wherein d1 and d2 are any two desired diameters of any desired section of the primary particle and d1 is >d2, of less than 250%, more preferably less than 200%, even more preferably less than 100%, even more preferably less than 50%.

The abovementioned deviation of the diameters of the individual particles is determined by the following method. A TEM photograph of a thin section of the composition according to the invention is first produced as described in the examples. A transmission electron microscopy photograph is then produced at a magnification of 10,000-fold to 85,000-fold. In an area of 833.7×828.8 nm, the largest and the smallest diameter are determined manually as d1 and d2 on 10 microgel primary particles. If the deviation defined above in at least 80%, more preferably at least 90%, even more preferably at least 95% of the microgel primary particles measured is in each case below 250%, more preferably below 100%, even more preferably less than 80%, even more preferably below 50%, the microgel primary particles have the deviation feature defined above.

If the concentration of the microgels in the composition is so high that the visible microgel primary particles overlap considerably, the evaluability can be improved by prior suitable dilution of the measurement sample.

In the composition according to the invention, the primary particles of the microgel (B) preferably have an average particle diameter of 5 to 500 nm, more preferably 20 to 400, even more preferably 30 to 300, even more preferably 40 to 100 nm (diameter values in accordance with DIN 53206).

Since the morphology of the microgels substantially does not change on incorporation into the thermoplastic material (A), the average particle diameter of the dispersed primary particles substantially corresponds to the average particle diameter of the microgel used.

in the composition according to the invention, the microgels (B) employed expediently have contents which are insoluble in toluene at 23° C. (gel content) of at least about 70 wt. %, more preferably at least about 80 wt. %, even more preferably at least about 90 wt. %. The content which is insoluble in toluene is determined here in toluene at 23°. In this method, 250 mg of the microgel are swollen in 25 ml toluene for 24 hours at 23° C., while shaking. After centrifugation at 20,000 rpm, the insoluble content is separated off and dried. The gel content is given by the quotient of the dried residue and the amount weighed out and is stated in percent by weight.

In the composition according to the invention, the microgels (B) employed expediently have a swelling index in toluene at 23° C. of less than about 80, more preferably less than 60, even more preferably less than 40. The swelling indices of the microgels (Qi) can therefore particularly preferably be between 1-15 and 1-10. The swelling index is calculated from the weight of the solvent-containing microgel (after centrifugation at 20,000 rpm) which has been swollen in toluene at 23° for 24 hours and the weight of the dry microgel.

$Qi$=wet weight of the microgel/dry weight of the microgel.

To determine the swelling index, 250 mg of the microgel are swollen in 25 ml toluene for 24 h, while shaking. The gel is centrifuged off and weighed, and then dried to constant weight at 70° C. and weighed again.

In the composition according to the invention, the microgels (B) employed expediently have glass transition temperatures Tg of −100° C. to +50° C. more preferably −80° C. to +20° C.

In the composition according to the invention, the microgels (B) employed expediently have a glass transition range of greater than 5° C., preferably greater than 10° C. more preferably greater than 20° C. Microgels which have such a glass transition range are as a rule not completely homogeneously crosslinked—in contrast to completely homogeneously radiation-crosslinked microgels. This means that the change in modulus from the matrix phase to the dispersed phase is not direct. As a result, under sudden stress tear effects between the matrix and the dispersed phase do not occur, whereby the mechanical properties, the swelling properties and the stress corrosion cracking, etc. are advantageously influenced.

The glass transition temperature (Tg) and the glass transition range (ΔTg) of the microgels are determined by means of differential scanning calorimetry (DSC). Two cooling down/heating up cycles are carried out for the determination of Tg and ΔTg. Tg and ΔTg are determined in the second heating up cycle. For the determinations, 10-12 mg of the selected microgel are introduced into a DSC sample container (standard aluminium pan) from Perkin-Elmer. The first DSC cycle is carried out by first cooling the sample down to −100° C. with liquid nitrogen and then heating it up to +150° C. at a rate of 20 K/min. The second DSC cycle is started by immediate cooling down of the sample as soon as a sample temperature of +150° C. is reached. The cooling down is carried out at a rate of approximately 320 K/min. In the second heating up cycle, the sample is heated up to +150° C. once again as in the first cycle. The rate of heating up in the second cycle is again 20 K/min. Tg and ΔTg are determined on a graph on the DSC curve of the second heating up operation. For this purpose, three straight lines are laid on the DSC curve. The 1st straight line is laid on the curve section of the DSC curve below Tg, the 2nd straight line is laid on the curve branch running through Tg which has the point of inflection and the 3rd straight line is laid on the curve branch of the DSC curve above Tg. Three straight lines with two points of intersection are obtained in this manner. The two points of intersection are each characterized by a characteristic temperature. The glass transition temperature Tg is obtained as the mean of these two temperatures and the glass transition range ΔTg is obtained from the difference between the two temperatures.

The microgels (B) which are based on homopolymers or random copolymers, are not crosslinked by high-energy radiation and are contained in the composition according to the invention can be prepared in a manner known per se (see, for example, EP-A-405 216, EP-A-854171, DE-A 4220563, GB-PS 1078400, DE 197 01 489.5, DE 197 01 488.7, DE 198 34 804.5, DE 198 34 803.7, DE 198 34 802.9, DE 199 29 347.3, DE 199 39 865.8, DE 199 42 620.1, DE 199 42 614.7, DE 100 21 070.8, DE 100 38 488.9, DE 100 39 749.2, DE 100 52 287.4, DE 100 56 311.2 and DE 100 61 174.5). The use of CR, BR and NBR microgels in mixtures with rubbers containing double bonds is claimed in the patents/patent applications EP-A 405 216, DE-A 4220563 and in GB-PS 1078400. DE 197 01 489.5 describes the use of subsequently modified microgels in mixtures with rubbers containing double bonds, such as NR, SBR and BR. According to the invention, microgels are expediently understood as meaning rubber particles which are obtained, in particular, by crosslinking of the following rubbers:

| | |
|---|---|
| BR: | polybutadiene, |
| ABR: | butadiene/acrylic acid C1-4-alkyl ester copolymers, |
| IR: | polyisoprene, |
| SBR: | random styrene/butadiene copolymers having styrene contents of 1-60, preferably 5-50 per cent by weight, |
| X-SBR: | carboxylated styrene/butadiene copolymers, |
| FM: | fluorinated rubber, |
| ACM: | acrylate rubber, |
| NBR: | polybutadiene/acrylonitrile copolymers having acrylonitrile contents of 5-60, preferably 10-50 per cent by weight, |
| X-NBR: | carboxylated nitrile rubbers, |
| CR: | polychloroprene, |
| IIR: | isobutylene/isoprene copolymers having isoprene contents of 0.5-10 per cent by weight, |
| BIIR: | brominated isobutylene/isoprene copolymers having bromine contents of 0.1-10 per cent by weight, |
| CIIR: | chlorinated isobutylene/isoprene copolymers having bromine contents of 0.1-10 per cent by weight, |
| HNBR: | partly and completely hydrogenated nitrile rubbers, |
| EPDM: | ethylene/propylene/diene copolymers, |
| EAM: | ethylene/acrylate copolymers, |
| EVM: | ethylene/vinyl acetate copolymers, |
| CO and ECO: | epichlorohydrin rubbers, |
| Q: | silicone rubbers, |
| AU: | polyester-urethane polymers, |
| EU: | polyether-urethane polymers, |
| ENR: | epoxidized natural rubber or mixtures thereof. |

The non-crosslinked microgel starting substances are expediently prepared by the following methods:

1. Emulsion polymerization
2. Naturally occurring latices, such as e.g. natural rubber latex, can moreover be employed.

In the thermoplastic elastomer composition according to the invention, the microgels (B) used are preferably those which are obtainable by emulsion polymerization and crosslinking.

The following monomers which can undergo free-radical polymerization are employed, for example, in the preparation, by emulsion polymerization, of the microgels used according to the invention: butadiene, styrene, acrylonitrile, isoprene, esters of acrylic and methacrylic acid, tetrafluoroethylene, vinylidene fluoride, hexafluoropropene, 2-chlorobutadiene, 2,3-dichlorobutadiene and carboxylic acids containing double bonds, such as e.g. acrylic acid, methacrylic acid, maleic acid, itaconic acid, etc., hydroxy compounds containing double bonds, such as e.g. hydroxyethyl methacrylate, hydroxyethyl acrylate and hydroxybutyl methacrylate, amine-functionalized (meth)acrylates, acrolein, N-vinyl-2-pyrrolidone, N-allyl-urea and N-allyl-thiourea, secondary amino-(meth)acrylic acid esters, such as 2-tert-butylaminoethyl methacrylate, and 2-tert-butylaminoethyl-methacrylamide, etc. The crosslinking of the rubber gel can be achieved directly during the emulsion polymerization, such as by copolymerization with multifunctional compounds having a crosslinking action, or by subsequent crosslinking as described below. Direct crosslinking during the emulsion polymerization is preferred. Preferred multifunctional comonomers are compounds having at least two, preferably 2 to 4 copolymerizable C=C double bonds, such as diisopropenylbenzene, divinylbenzene, divinyl ether, divinyl sulfone, diallyl phthalate, triallyl cyanurate, triallyl isocyanurate, 1,2-polybutadiene, N,N'-m-phenylenemaleimide, 2,4-toluoylenebis(maleimide) and/or triallyl trimellitate. Compounds which are moreover possible are the acrylates and methacrylates of polyhydric, preferably 2- to 4-hydric C2 to C10 alcohols, such as ethylene glycol, propane-1,2-diol, butanediol, hexanediol, polyethylene glycol having 2 to 20, preferably 2 to 8 oxyethylene units, neopentylglycol, bisphenol A, glycerol, trimethylolpropane, pentaerythritol and sorbitol, with unsaturated polyesters from aliphatic di- and polyols and maleic acid, fumaric acid and/or itaconic acid.

The crosslinking to give rubber microgels during the emulsion polymerization can also be carried out by continuing the polymerization up to high conversions, or in the monomer feed process by polymerization with high internal conversions. Carrying out the emulsion polymerization in the absence of regulators is also another possibility.

For the crosslinking of the non-crosslinked or the weakly crosslinked microgel starting substances after the emulsion polymerization, the latices which are obtained in the emulsion polymerization are most preferably employed. Natural rubber latices can also be crosslinked in this manner.

Suitable chemicals having a crosslinking action are, for example, organic peroxides, such as dicumyl peroxide, t-butyl cumyl peroxide, bis-(t-butylperoxyisopropyl)benzene, di-t-butyl peroxide, 2,5-dimethylhexane 2,5-dihydroperoxide, 2,5-dimethylhexine 3,2,5-dihydroperoxide, dibenzoyl peroxide, bis-(2,4-dichlorobenzoyl)peroxide and t-butyl perbenzoate, and organic azo compounds, such as azo-bis-isobutyronitrile and azo-bis-cyclohexanenitrile, as well as di- and polymercapto compounds, such as dimercaptoethane, 1,6-dimercaptohexane, 1,3,5-trimercaptotriazine and mercapto-terminated polysulfide rubbers, such as mercapto-terminated reaction products of bis-chloroethylformal with sodium polysulfide.

The optimum temperature for carrying out the post-crosslinking of course depends on the reactivity of the crosslinking agent, and the post-crosslinking can be carried out at temperatures from room temperature up to approx. 180° C., optionally under increased pressure (in this context see Houben-Weyl, Methoden der organischen Chemie, 4th edition, volume 14/2, page 848). Peroxides are particularly preferred crosslinking agents.

The crosslinking of rubbers containing C=C double bonds to give microgels can also be carried out in dispersion or emulsion with simultaneous partial, optionally complete, hydrogenation of the C=C double bond by hydrazine, as described in U.S. Pat. No. 5,302,696 or U.S. Pat. No. 5,442,009, or optionally other hydrogenating agents, for example organometallic hydride complexes.

An increase in particle size by agglomeration can optionally be carried out before, during or after the post-crosslinking.

In the preparation process used according to the invention, incompletely homogeneously crosslinked microgels which can have the advantages described above are always obtained.

Microgels which can be used for the preparation of the composition according to the invention are both non-modified microgels, which substantially contain no reactive groups, in particular on the surface, and modified microgels modified with functional groups, in particular on the surface. The latter microgels can be prepared by chemical reaction of the already crosslinked microgels with chemicals which are reactive towards C=C double bonds. These reactive chemicals are, in particular, those compounds with the aid of which polar groups, such as e.g. aldehyde, hydroxyl, carboxyl, nitrile etc. and sulfur-containing groups, such as e.g. mercapto, dithiocarbamate, polysulfide, xanthogenate, thiobenzothiazole and/or dithiophosphoric acid groups and/or unsaturated dicarboxylic acid groups, can be bonded chemically to the microgels. This also applies to N,N'-m-phenylenediamine. The aim of modification of the microgel is improvement in the compatibility of the microgel with the matrix, in order to achieve a good distributability during the preparation and a good coupling.

Particularly preferred methods of modification are grafting of the microgels with functional monomers and reaction with low molecular weight agents.

For grafting of the microgels with functional monomers, the aqueous microgel dispersion is expediently used as the starting material, which is reacted with polar monomers, such as acrylic acid, methacrylic acid, itaconic acid, hydroxyethyl (meth)acrylate, hydroxypropyl (meth)acrylate, hydroxybutyl (meth)acrylate, acrylamide, methacrylamide, acrylonitrile, acrolein, N-vinyl-2-pyrrolidone, N-allyl-urea and N-allyl-thiourea, and secondary amino-(meth)acrylic acid esters, such as 2-tert-butylaminoethyl methacrylate, and 2-tert-butylaminoethylmethacrylamide, under the conditions of a free-radical emulsion polymerization. Microgels having a core/shell morphology, wherein the shell should have a high compatibility with the matrix, are obtained in this manner. It is desirable for the monomer used in the modification step to be grafted as quantitatively as possible on to the non-modified microgel. The functional monomers are expediently metered in before the complete crosslinking of the microgels.

The following reagents are possible in particular for surface modification of the microgels with low molecular weight agents: elemental sulfur, hydrogen sulfide and/or alkylpolymercaptans, such as 1,2-dimercaptoethane or 1,6-dimercaptohexane, moreover dialkyl- and dialkylaryldithiocarbamate, such as the alkali metal salts of dimethyldithiocarbamate and/or dibenzyldithiocarbamate, furthermore alkyl- and arylxanthogenates, such as potassium ethylxanthogenate and sodium isopropylxanthogenate, as well as reaction with the alkali metal or alkaline earth metal salts of dibutyldithiophosphoric acid and dioctyldithiophosphoric acid as well as dodecyldithiophosphoric acid. The reactions mentioned can advantageously also be carried out in the presence of sulfur, the sulfur being co-incorporated with the formation of polysulfidic bonds. Free radical initiators, such as organic and inorganic peroxides and/or azo initiators, can be added for the addition of this compound.

A modification of microgels containing double bonds, such as e.g. by ozonolysis and by halogenation with chlorine, bromine and iodine, is also possible. A further reaction of modified microgels, such as e.g. the preparation of microgels modified by hydroxyl groups from epoxidized microgels, is also understood as chemical modification of microgels.

In a preferred embodiment, the microgels are modified by hydroxyl groups, in particular also on the surface thereof. The hydroxyl group content of the microgels is determined as the hydroxyl number with the dimension mg KOH/g polymer by reaction with acetic anhydride and titration of the acetic acid thereby liberated with KOH in accordance with DIN 53240. The hydroxyl number of the microgels is preferably between 0.1-100, even more preferably between 0.5-50 mg KOH/g polymer.

The amount of modifying agent employed depends on the activity thereof and the requirements imposed in the individual case and is in the range from 0.05 to 30 percent by weight, based on the total amount of rubber microgel employed, and 0.5-10 percent by weight, based on the total amount of rubber gel, is particularly preferred.

The modification reactions can be carried out at temperatures of 0-180° C., preferably 20-95° C., optionally under a pressure of 1-30 bar. The modifications can be carried out on rubber microgels in substance or in the form of their dispersion, it being possible to use inert organic solvents or also water as the reaction medium in the latter case. The modification is particularly preferably carried out in an aqueous dispersion of the crosslinked rubber.

The use of non-modified microgels is preferred in particular in the case of non-polar thermoplastic materials (A), such as, for example, in the case of polypropylene, polyethylene and block copolymers based on styrene, butadiene and isoprene (SBR, SIR) as well as hydrogenated isoprene/styrene block copolymers (SEBS) and conventional TPE-Os and TPE-Vs, etc.

The use of modified microgels is preferred in particular in the case of polar thermoplastic materials (A), such as PA, TPE-A, PU, TPE-U, PC, PET, PBT, POM, PMMA, PVC, ABS, PTFE, PVDF, etc.

The average diameter of the microgels prepared can be adjusted with a high accuracy, for example to 0.1 micrometer (100 nm)±0.01 micrometer (10 nm), so that, for example, a particle size distribution in which at least 75% of all the microgel particles are between 0.095 micrometer and 0.105 micrometer in size is achieved. Other average diameters of the microgels, in particular in the range between 5 to 500 nm, can be established with the same accuracy (at least 75 wt. % of all the particles lie around the maximum of the integrated particle size distribution curve (determined by light scattering) in a range of ±10% above and below the maximum) and employed. As a result, the morphology of the microgels dispersed in the composition according to the invention can be adjusted with practically "pinpoint accuracy" and the properties of the composition according to the invention and of the plastics prepared therefrom, for example, can be adjusted. The preparation of particularly finely divided microgels by emulsion polymerization is carried out by controlling the reaction parameters in a manner known per se (see e.g. H. G. Elias, Makromoleküle, volume 2, Technologie, 5th edition, 1992, page 99 et seq.).

It is not possible for the morphology of the dispersed phase of the TPEs prepared in accordance with the prior art by "in situ reactive processing" or dynamic vulcanization to be adjusted with this precision.

The microgels prepared in this way can be worked up, for example, by evaporation, coagulation, by co-coagulation with a further latex polymer, by freeze-coagulation (cf. U.S. Pat. No. 2,187,146) or by spray drying. Commercially available flow auxiliaries, such as, for example, $CaCO_3$ or silicate, can also be added in the case of working up by spray drying.

Thermoplastic Materials (A)

In the composition according to the invention, the thermoplastic materials (A) employed preferably have a Vicat softening temperature of at least 50° C., more preferably at least 80° C., even more preferably at least 100° C.

The Vicat softening temperature is determined in accordance with DIN EN ISO 306:1996.

In the composition according to the invention, the thermoplastic material (A) is expediently chosen from thermoplastic polymers (A1) and thermoplastic elastomers (A2).

If thermoplastic polymers (A1) are used as the starting material of the composition according to the invention, the thermoplastic elastomer compositions are formed by incorporation of the microgels used according to the invention.

On the other hand, if thermoplastic elastomers (A2) are used as the starting material of the composition according to the invention, the thermoplastic elastomer properties are retained, and the properties of the thermoplastic elastomers (A2) can be modified in a controlled manner, as shown below, by the addition of the microgels (B) of suitable composition and suitable morphology.

Thus, the properties of the known TPEs, such as TPE-U and TPE-A, such as, in particular, the heat distortion point and transparency of the TPE-Us or resistance of the TPE-As to oils, can be improved by incorporation of the microgels (B).

In the composition according to the invention, the difference in glass transition temperature between the thermoplastic material (A) and the microgel (B) is expediently between 0 and 250° C.

In the composition according to the invention, the weight ratio of thermoplastic material (A)/microgel (B) is expediently from 1:99 to 99:1, preferably from 10:90 to 90:10, particularly preferably 20:80 to 80:20.

If thermoplastic polymers (A1) are used as the thermoplastic materials (A), the weight ratio of (A1)/(B) is preferably 95:5 to 30:70.

If thermoplastic elastomers (A2) are used as the thermoplastic materials (A), the weight ratio of (A2)/(B) is preferably 98:2 to 20:80, more preferably 95:5 to 20:80.

The invention also includes the use of the thermoplastic elastomer composition according to the invention as a socalled masterbatch (concentrate) for incorporation into thermoplastic materials. Such masterbatches of course have high microgel concentrations, such as, for example, of more than 30 wt. %.

Thermoplastic Polymers (A1)

The thermoplastic polymers (A1) which can be employed in the thermoplastic elastomer composition according to the invention include, for example, standard thermoplastics, socalled techno-thermoplastics and so-called high performance thermoplastics (cf. H. G. Elias Makromoleküle volume 2, 5th ed., Hüthig & Wepf Verlag, 1992, page 443 et seq.).

The thermoplastic polymers (A1) which can be employed in the composition according to the invention include, for example, non-polar thermoplastic materials, such as, for example, polypropylene, polyethylene, such as HDPE, LDPE and LLDPE, polystyrene, etc., and polar thermoplastic materials, such as PU, PC, EVM, PVA, PVAC, polyvinylbutyral, PET, PBT, POM, PMMA, PVC, ABS, AES, SAN, PTFE, CTFE, PVF, PVDF, polyimides and PA, such as, in particular PA-6 (nylon), more preferably PA-4, PA-66 (Perlon), PA-69, PA-610, PA-11, PA-12, PA 612, PA-MXD6, etc.

Preferred thermoplastic polymers (A1) from which the thermoplastic elastomer compositions according to the invention are prepared include: PP, PE, PS, PU, PC, SAN, PVC and PA.

Thermoplastic Elastomers (A2)

The thermoplastic elastomers (A2) which can be employed in the microgel-containing thermoplastic elastomer composition according to the invention include, for example, the thermoplastic elastomers known from the prior art which are already mentioned above, such as the block copolymers, such as styrene block copolymers (TPE-S: SBS, SIS, and hydrogenated isoprene/styrene block copolymers (SEBS)), thermoplastic polyamides (TPE-A), thermoplastic copolyesters (TPE-E), thermoplastic polyurethanes (TPE-U), the blends mentioned of thermoplastics and elastomers, such as thermoplastic polyolefins (TPE-O) and thermoplastic vulcanization products (TPE-V), NR/PP blends (thermoplastic natural rubber), NBR/PP blends, IIR (XIIR)/PP blends, EVA/PVDC blends, NBR/PVC blends, etc. Reference may furthermore be made to the description of the abovementioned TPEs from the prior art.

Examples of the block polymers which can preferably be used according to the invention as the thermoplastic elastomer (A2) include the following:

Styrene Block Copolymers (TPE-S)

The three-block structure of two thermoplastic polystyrene end blocks and an elastomeric middle block characterizes this group. The polystyrene hard segments form domains, i.e. small volume elements with uniform material characteristics, which act technically as three-dimensional physical crosslinking sites for the flexible soft segments. A distinction is made between the following styrene block copolymers according to the nature of the middle block: butadiene (SBS), isoprene (SIS) and ethylene/butylene (SEBS) types. Branched block copolymer types can be prepared by linking via multifunctional centres.

Polyether/Polyamide Block Copolymers (TPE-A)

The block copolymers based on polyether(ester)/polyamide are formed by insertion of flexible polyether(ester) groups into polyamide molecular chains. The polyether(ester) blocks form the soft and elastic segments, while the hard polyamide blocks assume the function of the thermoplastic hard phase. The hard segments obtain their high strength due to a high density of aromatic groups and/or amide groups, which are responsible, by hydrogen bridge formation, for physical crosslinking of the two phases.

Thermoplastic Copolyesters, Polyether-Esters (TPE-E)

Thermoplastic copolyesters are built up alternately from hard polyester segments and soft polyether components. The polyester blocks, formed from diols (e.g. butane-1,4-diol) and dicarboxylic acids (e.g. terephthalic acid), are esterified in a condensation reaction with long-chain polyethers which carry hydroxyl end groups. Very different hardness ranges can be established, depending on the length of the hard and soft segments.

Thermoplastic Polyurethanes (TPE-U)

The block copolymers of polyurethane are synthesized by polyaddition of diols and diisocyanates. The soft segments formed from the reaction between diisocyanate and a polyol function as elastic components under mechanical stress. The hard segments (urethane groups) serving as crosslinking sites are obtained by reaction of the diisocyanate with a low molecular weight diol for chain lengthening. As with the TPE-S types, the finely divided hard segments form domains which effect a quasi-crosslinking via hydrogen bridges or generally via states of order in that in each case two or more domains enter into a relationship with one another. Crystallization of the hard segments can occur here. A distinction is made between polyester, polyether and chemically combined polyester/polyether types, depending on the diol employed as the starting monomer.

In respect of the second sub-group of the thermoplastic TPE (A2), the elastomer alloys, reference may be made to the statements made above in connection with the prior art. Elastomer alloys which can be used according to the invention include, for example, the following:

EPDM/PP Blends

As a rule, EPDM terpolymers are employed for the rubber phase, and polypropylene is usually used as the polyolefin. The soft phase can be present in both non-crosslinked (TPE-0) and crosslinked (TPE-V) form. With a predominant PP content, the thermoplastic is the continuous phase. With a very high elastomer content, the structure can also be inverted, so that PP-reinforced EPDM blends result. This class of elastomer alloys therefore covers a wide hardness range. All the representatives are distinguished by a high resistance to UV radiation and ozone and to many organic and inorganic media. On the other hand, the resistance to aliphatic and aromatic solvents is poor to moderate.

NR/PP Blends (Thermoplastic Natural Rubber)

In a similar manner to EPDM, NR can also be compounded with PP and also with PP/PE mixtures to give a thermoplastically processable natural rubber (TPNR). Dynamic crosslinking of NR as a rule takes place in the presence of peroxides above 170° C. Compared with conventional NR vulcanization products, TPNR blends have a significantly higher resistance to weathering and ozone.

NBR/PP Blends

In these polymer blends, precrosslinked or partly crosslinked acrylonitrile/butadiene rubber (NBR) is dispersed as the elastomeric phase in the PP hard phase. Characteristic features of these blends are high resistances to fuels, oils, acids and alkalis and to ozone and weathering influences.

IIR (XIIR)/PP Blends

Butyl or halobutyl rubbers are the elastomeric phase constituents in this class. On the basis of a diene rubber having a non-polar character (comparable to NR/R), the excellent permeation properties of butyl rubber with respect to many gases are utilized for the properties profile of the TPE blends obtainable by blending with PP.

EVA/PVDC Blends

These are based on a blend of ethylene/vinyl acetate rubber (EVA) and polyvinylidene chloride (PVDC) as the thermoplastic phase. The properties profile in the medium hardness range of 60 to 80 ShA is characterized by a good oil and an outstanding weathering resistance.

NBR/PVC Blends

These polymer blends, which are chiefly prepared to improve the properties of plasticized PVC, are mixtures of acrylonitrile/butadiene rubber (NBR) and polyvinyl chloride (PVC). In the case of requirements for a better resistance to oils and fats, in particular, plasticized PVC grades provided with high plasticizer contents can no longer be employed (extraction of plasticizer). In these NBR/PVC blends, NBR acts as a polymeric, non-extractable plasticizer and can be mixed with PVC in virtually any ratio.

Particularly preferred thermoplastic elastomers (A2) include: TPE-U, TPE-A and TPE-V.

Preferred thermoplastic elastomer compositions according to the invention comprise TPE-U, TPE-A, PA or PP as the thermoplastic material (A) and crosslinked NBR or SBR microgels, which can be OH-modified.

The following combinations of components (A) and (B) are particularly preferred:

| Thermoplastic material (A) | Microgel (B) based on |
|---|---|
| TPE-U | SBR (OH-modified) peroxidically crosslinked |
| PP | SBR (OH-modified) EGDMA-crosslinked |
| PP | SBR (non-modified) DVB-crosslinked |
| TPE-A | SBR (OH-modified) EGDMA-crosslinked |
| PP | NBR peroxidically crosslinked |
| PA | NBR peroxidically crosslinked |

The compositions according to the invention behave like thermoplastic elastomers, i.e. they combine the advantages of thermoplastic processability with the properties of elastomers as described in the introduction in connection with the TPEs from the prior art.

The compositions according to the invention can additionally comprise at least one conventional plastics additive, such as inorganic and/or organic fillers, plasticizers, inorganic and/or organic pigments, flameproofing agents, agents against pests, such as e.g. termites, agents against marten bites, etc. and other conventional plastics additives. The compositions according to the invention can contain these in an amount of up to about 40 wt. %, preferably up to about 20 wt. %, based on the total amount of the composition.

The compositions according to the invention are obtainable by mixing at least one thermoplastic material (A) and at least one crosslinked microgel (B) which is not crosslinked by using high-energy radiation.

The present invention furthermore relates to the use of crosslinked microgels (B) which are not crosslinked by using high-energy radiation in thermoplastic materials (A). In respect of the preferred variants of components (A) and (B), reference may be made here to the above explanations.

Preparation of the Compositions According to the Invention

The present invention furthermore relates to a process for the preparation of the compositions according to the invention by mixing at least one thermoplastic material (A) and at least one microgel (B). The preparation of the compositions according to the invention is in general carried out such that the microgel (B) is prepared separately before the mixing with the thermoplastic material (A).

The compositions according to the invention comprising (optionally) modified microgel (B) and the thermoplastic material (A) can be prepared in various ways: On the one hand it is of course possible to mix the individual components. Units which are suitable for this are, for example, rolls, multiple roll mills, dissolvers, internal mixers or also mixing extruders.

The mixing units known from plastics and rubber technology (Saechtling Kunststoff Taschenbuch, 24th edition, p. 61 and p. 148 et seq.; DIN 24450; Mischen von Kunststoff-und Kautschukprodukten, VDI-Kunststofftechnik, p 241 et seq.), such as e.g. co-kneaders, single-screw extruders (with special mixing elements), twin-screw extruders, cascade extruders, devolatilizing extruders, multiple-screw extruders, pinned disc extruders, screw kneaders and planetary gear extruders, as well as multiple-shaft reactors, are furthermore suitable as the mixing unit. Twin-screw extruders, in which the screws rotate in the same direction, with devolatilization (planetary gear extruders with devolatilization) are preferably used.

Further mixing of the compositions according to the invention of (optionally) modified microgel (B) and the thermoplastic materials (A) with additional fillers and optionally conventional auxiliary substances, as mentioned above, can be carried out in conventional mixing units, such as rolls, internal mixers, multiple roll mills, dissolvers or also mixing extruders. Preferred mixing temperatures are room temperature (23° C.) to 280° C., preferably about 60° C. to 200° C.

The invention furthermore relates to the use of the compositions according to the invention for the production of thermoplastically processable shaped articles and the shaped articles obtainable from the compositions according to the invention. Examples of such shaped articles include: plug and socket connections, damping, in particular vibration- and shock-absorbing elements, acoustic damping elements, profiles, films, in particular damping films, floor mats, clothing, in particular shoe inlays, shoes, in particular ski boots, shoe soles, electronic components, housings for electronic components, tools, decorative shaped articles, composite materials, mouldings for automobiles, etc.

The shaped articles according to the invention can be produced from the compositions according to the invention by conventional processing processes for thermoplastic elastomers, such as by melt extrusion, calendering, IM, CM and RIM.

The present invention is explained further by the following examples. However, the invention is not limited to the disclosure content of the examples.

EXAMPLES

1. Preparation of Microgels (B)

Preparation Example 1

NBR-Based Microgel from Peroxidic Crosslinking (OBR 1102 C)

The NBR microgel OBR 1102 C is prepared as described in DE 19701487. An NBR latex is used as the starting material. The NBR latex has the following features: content of incorporated acrylonitrile: 43 wt. %, solids concentration: 16 wt. %, pH: 10.8, diameter of the latex particles ($d_z$): 140 nm, particle density: 0.9984 g/cm$^3$, the gel content of the latex is 2.6 wt. %, the swelling index of the gel content in toluene is 18.5 and the glass transition temperature (Tg) is −15° C.

7 phr dicumyl peroxide (DCP) is employed for the preparation of OBR 1102 C.

Characteristic data of the microgel obtained are summarized in Table 1.

Preparation Example 2

SBR-Based Microgel from Peroxidic Crosslinking (OBR 1046 C)

The microgel was prepared by crosslinking an SBR latex with 40 wt. % of incorporated styrene (Krylene 1721 from Bayer France) in latex form with 1.5 phr dicumyl peroxide (DCP) and subsequent grafting with 5 phr hydroxyethyl methacrylate (HEMA).

The crosslinking of Krylene 1721 with dicumyl peroxide was carried out as described in Examples 1)-4) of U.S. Pat. No. 6,127,488, 1.5 phr dicumyl peroxide being employed for the crosslinking. The latex Krylene 1721 on which the microgel is based has the following features:

solids concentration: 21 wt. %; pH: 10.4; diameter of the latex particles: d10=40 nm; $d_z$=53 nm; d80=62 nm; $SA_{spec.}$=121; particle density: 0.9673 g/cm$^3$, the gel content of the microgel is 3.8 wt. %, the swelling index of the gel content is: 25.8 and the glass transition temperature (Tg) is −31.5° C.

After the reaction with 1.5 phr dicumyl peroxide, the product has the following characteristic data:

solids concentration: 21 wt. %; pH: 10.2; diameter of the latex particles: d10=37 nm; d50=53 nm; d80=62 nm; particle density: 0.9958 g/cm$^3$, the gel content of the microgel is 90.5 wt. %; the swelling index of the gel content is: 5.8 and the glass transition temperature (Tg) is −6.5° C.

The hydroxyl modification of the SBR latex crosslinked with 1.5 phr is carried out by grafting with 5 phr hydroxyethyl methacrylate. The reaction with HEMA, the stabilization and the working up of the hydroxyl-modified latex were carried out as described in U.S. Pat. No. 6,399,706, Example 2.

The characteristic data of the hydroxyl-modified SBR microgel are summarized in Table 1.

Before use of the microgel in TPU, it is dried to constant weight in a vacuum drying cabinet from Heraeus Instruments, model Vacutherm VT 6130, under 100 mbar.

Preparation Example 3

SBR-Based Microgel from Direct Polymerization

Crosslinking with DVB (OBR1126E)

This microgel was prepared by copolymerization of 23% styrene, 76% butadiene and 1% divinylbenzene in emulsion.

Preparation Example 4

Microgel based on hydroxyl-modified BR, prepared by direct emulsion polymerization using the crosslinking comonomer ethylene glycol dimethacrylate (OBR 1118).

325 g of the Na salt of a long-chain alkylsulfonic acid (330 g Mersolat K30/95 from Bayer AG) and 235 g of the Na salt of methylene-bridged naphthalenesulfonic acid (Baykanol PQ from Bayer AG) are dissolved in 18.71 kg water and the solution is initially introduced into a 40 l autoclave. The autoclave is evacuated and charged with nitrogen 3 times. Thereafter, 9.200 kg butadiene, 550 g ethylene glycol dimethacrylate (90% pure), 312 g hydroxyethyl methacrylate (96%) and 0.75 g hydroquinone monomethyl ether are added. The reaction mixture is heated up to 30° C., while stirring. An aqueous solution consisting of 170 g water, 1.69 g ethylenediaminetetraacetic acid (Merck-Schuchradt), 1.35 g iron(II) sulfate*7H$_2$O, 3.47 g Rongalit C (Merck-Schuchradt) and 5.24 g trisodium phosphate*12H$_2$O is then metered in. The reaction is started by addition of an aqueous solution of 2.8 g p-menthane hydroperoxide (Trigonox NT 50 from Akzo-Degussa) and 10.53 g Mersolat K 30/95, dissolved in 250 g water. After a reaction time of 5 hours, the mixture is post-activated with an aqueous solution consisting of 250 g water, in which 10.53 g Mersolat K30/95 and 2.8 g p-menthane hydroperoxide (Trigonox NT 50) are dissolved. When a polymerization conversion of 95-99% is reached, the polymerization is stopped by addition of an aqueous solution of 25.53 g diethylhydroxylamine, dissolved in 500 g water. Thereafter, unreacted monomers are removed from the latex by stripping with steam. The latex is filtered and, as in Example 2 of U.S. Pat. No. 6,399,706, stabilizer is added and the product is coagulated and dried.

The characteristic data of the SBR gel are summarized in Table 1.

Preparation Example 5

NBR-Based Microgel from Peroxidic Crosslinking (OBR 1102 B)

An NBR-based microgel from peroxidic crosslinking was prepared as in Preparation Example 1 with DCP of 5 instead of 7 phr.

Acid Number

The acid number is determined in accordance with DIN 53402 as already mentioned above and corresponds to the amount of KOH in mg which is necessary to neutralize one g of the polymer.

Gel Content

The gel content corresponds to the content which is insoluble in toluene at 23° C. It is determined as described above.

Glass Transition Temperature

The glass transition temperatures were determined as mentioned above.

Glass Transition Range:

The glass transition range was determined as described above.

TABLE 1

Properties of the microgels (B)

| Preparation Example | Product name | Microgel type | Cross-linking [phr] | $D_z$ [nm] | SAspec. [m$^2$/g] | Density [g/cm$^3$] | Gel content [wt. %] | QI | Tg [° C.] | ΔTg [° C.] | OH number [mg KOH/g pol.] | Acid number |
|---|---|---|---|---|---|---|---|---|---|---|---|---|
| 1 | OBR 1102 C | NBR | DCP/7 | 132 | 462 | 1.0236 | 93.7 | 7.9 | −0.5 | 15.8 | 16.4 | 2.3 |
| 2 | OBR 1046 C | SBR | DCP/1.5 | 51 | 117 | 1.0112 | 96.3 | 5.9 | 4.5 | 33.8 | 10.3 | 8.4 |
| 3 | OBR 1126E | SBR | DVB/1.0 | — | — | — | 83.4 | 14.7 | −58.5 | 10.6 | 9.5 | 13.2 |
| 4 | OBR 1118 | BR | EGDMA/5% | 50 | 166 | 0.9245 | 99.1 | 7.7 | −79 | 7.6 | 21.9 | 3.4 |
| 5 | OBR 1102 B | NBR | DCP/5 | 129 | 478 | 1.0184 | 94.3 | 8.8 | −1.5 | 13.2 | 18 | 3.1 |

The abbreviations in the table have the following meanings:
DCP: dicumyl peroxide
EGDMA: ethylene glycol dimethacrylate
phr: parts per 100 of rubber
SAspec.: specific surface area in m$^2$/g
$d_z$: According to DIN 53 206, the diameter $\bar{d}_z$ is defined as the median or central value above and below which in each case half of all the particle sizes lies. The particle diameter of the latex particles is determined by means of ultracentrifugation (W. Scholtan, H. Lange, "Bestimmung der Teilchengrößenverteilung von Latices mit der Ultrazentrifuge", Kolloid-Zeitschrift und Zeitschrift für Polymere (1972) volume 250, issue 8). Thediameter values in the latex and for the primary particles in the compositions according to the invention are practically the same, since the particle size of the microgel particles is practically unchanged during the preparation of the composition according to the invention.
QI: swelling index
Tg: glass transition temperature
ΔTg: glass transition range For the determination of Tg and ΔTg, the DSC-2 apparatus from Perkin-Elmer is used.

Swelling Index QI

The swelling index QI was determined as follows:

The swelling index is calculated from the weight of the solvent-containing microgel swollen in toluene at 23° for 24 hours and the weight of the dry microgel:

$Qi$=wet weight of the microgel/dry weight of the microgel.

To determine the swelling index, 250 mg of the microgel are swollen in 25 ml toluene for 24 h, while shaking. The (wet) gel swollen with toluene is weighed, after centrifugation at 20,000 rpm, and then dried to constant weight at 70° C. and weighed again.

OH Number (Hydroxyl Number)

The OH number (hydroxyl number) is determined in accordance with DIN 53240 and corresponds to the amount of KOH in mg which is equivalent to the amount of acetic acid which is liberated during acetylation of 1 g of substance with acetic anhydride.

2. General Instructions for the Mixing Process in an Internal Mixer

The preparation of the compositions according to the invention is carried out with a laboratory internal mixer (Rheocord 90, Rheomix 600 E mixing chamber, Haake) with tangential rotors, compressed air cooling and a chamber volume of 350 cm$^3$. Mixing is carried out at a speed of 100 rpm, an initial chamber temperature of 160° C. and a filling level of 70%. Mixtures are prepared with a rubber microgel (B)/thermoplastic material (A) in the stated ratios of, for example, 80/20, 70/30, 60/40, 50/50, 40/60, 30/70, 20/80 and 10/90. For this, the thermoplastic is first introduced into the mixture and melted in the course of 4 min. The microgel is then metered in, the plunger is closed and the components are mixed for 8 min. An increase in temperature takes place during this procedure. The torque passes through a maximum with a final plateau. After the mixing, optically homogeneous samples which have approximately the colour of the microgel are removed.

3. Detection of the Morphology

The morphology is detected with the aid of transmission electron microscopy photographs (TEM) and with the aid of atomic force microscopy (AFM).
1. TEM:
Sample preparation for the transmission electron microscopy analyses
Cryo-Ultramicrotomy
Procedure:
Thin sections having a section thickness of approx. 70 nm were produced under cryo conditions by means of diamond blades. To improve the contrast, $OsO_4$ can be used as a contrast medium.
The thin sections were transferred to copper gauze, dried and initially assessed over a large area in the TEM. Thereafter, with an accelerating voltage of 80 kV at 12.000-fold magnification, area displayed=833.7*828.8 nm, characteristic image sections were stored and evaluated by means of digital image software for documentation purposes.
2. AFM: Topometrix Model TMX 2010.
For the analysis, bright sections were prepared and transferred into the AF microscope. The photographs were produced by the layered imaging method.
If the concentration of the microgel is too high, i.e. the primary particles overlap, a dilution can be carried out beforehand.

Example 1

Composition According to the Invention Based on PP

The microgel OBR 1118 from Preparation Example 4 is mixed with PP Atofina PPH 3060 (produced by ATOFINA) as described below. The preparation of the composition is carried out with a laboratory extruder (ZSK 25, manufacturer Krupp Werner u. Pfleiderer, Stuttgart; screw diameter d=25 mm, l/d>38; throughputs: 2.0 to 5.0 kg/h, speeds: 100 to 220 rpm) with shafts running in the same direction. Mixing is carried out at a speed of 100 to 220 rpm, an intake zone temperature of 160° C. and a throughput of 5 kg/h. Mixtures having an MG/PP weight ratio of 5/95%, 10/90%, 15/85%, 20/80%, 25/75%, 30/70% and 35/65% are prepared. For this, the PP and MG are first metered continuously into the extruder via gravimetric metering balances. An increase in the temperature to 180 to 195° C. takes place in the extruder. After the processing, optically homogeneous samples which have approximately the colour of the microgel are removed.

A conventionally prepared TPE-V (Santoprene Rubber 201-87) from Advanced Elastomer Systems (M1) is employed as a reference for the microgel-based TPE-Vs.

The compositions/test specimens obtained showed the following properties.

Example 2

Composition According to the Invention Based on PP

The microgel from Example 2 (OBR 1046 C) is mixed with a PP Atofina PPH 3060 (produced by ATOFINA) as described below. The preparation of the composition is carried out with a laboratory extruder (ZSK 25, manufacturer Krupp Werner u. Pfleiderer, Stuttgart; screw diameter d=25 mm, l/d>38; throughputs: 2.0 to 3.5 kg/h, speeds: 100 to 200 rpm) with shafts running in the same direction. Mixing is carried out at a speed of 100 to 220 rpm, an intake zone temperature of 165° C. and a throughput of 5 kg/h. Mixtures having an MG/PP weight ratio, for example, of 5/95%, 10/90%, 15/85%, 20/80%, 25/75%, 30/70% and 35/65% are prepared. For this, the PP and MG are first metered continuously into the extruder via gravimetric metering balances. An increase in the temperature to 190 to 210° C. takes place in the extruder. After the processing, optically homogeneous samples which have approximately the colour of the microgel are removed.

A conventionally prepared TPE-V (Santoprene Rubber 201-87) from Advanced Elastomer Systems (M1) is employed as a reference for the microgel-based TPE-Vs.

The compositions/test specimens obtained showed the following properties.

TABLE 3

Results of the physical testing of the microgel/TPE-V mixtures according to the invention analysed (M2 and M3) and of the TPE-V (M1)

| Material | | M1 | M2 | M3 |
|---|---|---|---|---|
| Santoprene Rubber 201-87 | | 100 | 0 | 0 |
| Atofina PPH 3060 | [%] | 0 | 70 | 65 |
| OBR1046C | [%] | 0 | 30 | 35 |
| Hardness, immediate test | Shore A | 87 | 93 | 88 |
| Tensile strength | [MPa] | 15.9 | 23.2 | 19.8 |
| Elongation at break | [%] | 530 | 168 | 250 |
| Modulus at 100% elongation | [MPa] | 6.9 | 8.7 | 8.3 |

Example 3

Composition According to the Invention Based on PP

Microgels (OBR 1126 E) from Example 3 are mixed with a PP Moplen Q 30 P (produced by Montel Polyolefins) as described below. The preparation of the composition is carried out with a laboratory extruder (ZSK 25, manufacturer

TABLE 2

Results of the physical testing of the microgel/TPE-V mixtures according to the invention analysed (M2 to M7) and of the TPE-V (M1)

| Material | | M1 | M2 | M3 | M4 | M5 | M6 | M7 | M8 |
|---|---|---|---|---|---|---|---|---|---|
| Santoprene Rubber 201-87 | | 100 | 0 | 0 | 0 | 0 | 0 | 0 | 0 |
| Atofina PPH 3060 | [%] | 0 | 95 | 90 | 85 | 80 | 75 | 70 | 65 |
| OBR1118 | [%] | 0 | 5 | 10 | 15 | 20 | 25 | 30 | 35 |
| Hardness, immediate test | Shore A | 87 | — | — | — | 96 | 92 | 89 | 86 |
| Tensile strength | [MPa] | 15.9 | 34 | 30.6 | 27.1 | 22.7 | 19.8 | 19.2 | 18.5 |
| Elongation at break | [%] | 530 | 15 | 30 | 57 | 89 | 133 | 210 | 270 |
| Modulus at 100% elongation | [MPa] | 6.9 | — | — | — | — | 7.4 | 7.6 | 7.9 |

Krupp Werner u. Pfleiderer, Stuttgart; screw diameter d=25 mm, l/d>38; throughputs: 2.0 kg/h, speeds: 100 to 190 rpm) with shafts running in the same direction. Mixing is carried out at a speed of 100 to 220 rpm, an intake zone temperature of 165° C. and a throughput of 5 kg/h. Mixtures having an MG/PP weight ratio, for example, of 5/95%, 10/90%, 15/85%, 20/80%, 25/75%, 30/70% and 35/65% are prepared. For this, the PP and MG are first metered continuously into the extruder via gravimetric metering balances. An increase in the temperature to 175 to 190° C. takes place in the extruder. After the processing, optically homogeneous samples which have approximately the colour of the microgel are removed.

A conventionally prepared TPE-V (Santoprene Rubber 201-87) from Advanced Elastomer Systems (M1) is employed as a reference for the microgel-based TPE-Vs.

The compositions/test specimens obtained showed the following properties.

TABLE 4

Results of the physical testing of the microgel/TPE-V mixtures according to the invention analysed (M2 and M3) and of the TPE-V (M1)

| Material | | M1 | M2 | M3 |
|---|---|---|---|---|
| Santoprene Rubber 201-87 | | 100 | 0 | 0 |
| Moplen Q 30 P | [%] | 0 | 70 | 65 |
| OBR 1126 E | [%] | 0 | 30 | 35 |
| Hardness, immediate test | Shore A | 87 | 88 | 85 |
| Tensile strength | [MPa] | 15.9 | 16.2 | 17.8 |
| Elongation at break | [%] | 530 | 193 | 327 |
| Modulus at 100% elongation | [MPa] | 6.9 | 9.2 | 8.9 |

Example 4

Compositions According to the Invention Based on TPE-U

The microgel from Preparation Example 2 (OBR 1046C) is used as the microgel. Desmopan 385, a TPE-U from Bayer AG, is used as the TPU to which the microgel is added.

The preparation of the composition is carried out with a laboratory extruder (ZSK 25, manufacturer Krupp Werner u. Pfleiderer, Stuttgart; screw diameter d=25 mm, l/d>38; throughputs: 2.0 to 5.0 kg/h, speeds: 100 to 220 rpm) with shafts running in the same direction. Mixing is carried out at a speed of 100 to 220 rpm, an intake zone temperature of 160° C. and a throughput of 5 kg/h: Mixtures having an MG/TPU weight ratio of 5/95%, 10/90%, 15/85%, 20/80%, 25/75% and 30/70% are prepared. For this, the TPU and MG are first metered continuously into the extruder via gravimetric metering balances. An increase in the temperature to 195° C. takes place in the extruder. After the processing, optically and physically homogeneous samples which have approximately the colour of the microgel and are transparent are removed.

A conventionally prepared TPU (Desmopan 385) (M1) is employed as a reference for the microgel-based TPE-Us.

Injection Moulding:

Standard tensile test specimens are injection-moulded from the granules obtained from the TPE-Us based on MG and the pure Desmopan 385. This is carried out with an injection moulding machine (model 320S from Arburg) at a machine temperature of 205-215° C., under a dynamic pressure of 10 bar and at a mould temperature of 60° C. The dwell time of the sample in the machine and in the mould is 50 seconds. The shot weight is 29.5 g.

FIG. 1 shows an electron microscopy photograph of the material obtained in Example 4. The dispersed, approximately spherical microgels can be very clearly seen.

Production of the Test Specimens:

50% F3 standard test bars are produced from all the samples. This is carried out by injection moulding of test sheets for all the materials. The test specimens are prepared from these test sheets. All the standard bars have a width of 14 mm in the head region and a bridge width of 7 mm. The thickness of the standard bars is 2 mm.

Physical Testing:

1. Tensile Test

The tensile test on the samples is carried out on 50% F3 standard test bars (see above) in accordance with DIN 53455. Testing is carried out with a universal testing machine (model 1445, Frank) with optical length recorders. The measurement range of the force transducer is 0-1,000 N. The results of the measurements are summarized in Table 5.

The following machine parameters were preset here:

| preliminary force | 0.1 N |
| speed to preliminary force | 1 mm/min |
| load | 1000 N |
| Vtest | 400 mm/min |

The elongation at break and stress at break values of the microgel-based TPE-Us are above the values of the pure constituent TPU phase even under high loads. The values determined are summarized in Table 2.

Shore A Hardness:

As a comparison to room temperature, the test specimens were additionally stored at +80° C. and at −2° C. in each case for 64 h and conditioned for 1 h at RT before the measurement. Within the framework of measurement accuracy, the samples with microgel show no significant changes in the Shore A hardness. The values determined are summarized in Table 6.

Colour Determination:

The colour of the test sheets is determined in accordance with the DIN standards DIN 5033 and DIN 6174 with a Match Rite CFS57 colorimeter from X-Rite GmbH. The colour values determined are summarized in Table 6. Although the microgel-containing test sheets have an intrinsic colour, they remain transparent even at a content of 30% MG.

TABLE 5

Results of the physical testing of the microgel/TPU mixtures according to the invention analysed (M2 to M7) and of the TPU Desmopan 385 (M1)

| Material | | M1 | M2 | M3 | M4 | M5 | M6 | M7 |
|---|---|---|---|---|---|---|---|---|
| Desmopan 385 | [%] | 100 | 95 | 90 | 85 | 80 | 75 | 70 |
| OBR 1046 C | [%] | 0 | 5 | 10 | 15 | 20 | 25 | 30 |
| Hardness, immediate test | Shore A | 87 | 87 | 87 | 87 | 85 | 84 | 84 |

TABLE 5-continued

Results of the physical testing of the microgel/TPU mixtures according to the invention analysed (M2 to M7) and of the TPU Desmopan 385 (M1)

| Material | | M1 | M2 | M3 | M4 | M5 | M6 | M7 |
|---|---|---|---|---|---|---|---|---|
| Hardness, stored at +80° C. for 64 h | Shore A | 87 | 85 | 84 | 84 | 82 | 81 | 81 |
| Hardness, stored at −21° C. for 64 h | Shore A | 88 | 89 | 88 | 88 | 87 | 87 | 87 |
| Tensile strength | [N/mm$^2$] | 9.6 | 19.1 | 17.9 | 17.4 | 16.6 | 15.8 | 13.2 |
| Elongation at break | [%] | 160 | 450 | 424 | 385 | 362 | 350 | 310 |
| Colour L | | 70.26 | 56.24 | 54.35 | 53.39 | 51.56 | 50.25 | 49.90 |
| Colour A | | −0.86 | 0.83 | 1.00 | 1.44 | 1.74 | 2.18 | 3.13 |
| Colour B | | 4.80 | 10.36 | 10.77 | 10.81 | 11.02 | 11.18 | 12.56 |

Ageing in Hot Air:

The ageing in hot air was carried out at 130° C. and 180° C. in each case for 1 h. The test specimens were then evaluated for appearance, shape and colour. As a comparison, test specimens without ageing in hot air were also evaluated. The results are shown in FIG. 4. It is found here, surprisingly, that the test specimens according to the invention are more dimensionally stable due to the addition of the microgel than without, the dimensional stability increasing as the microgel content increases.

Example 5

Compositions According to the Invention Based on TPE-A and Comparison Compositions Preparation Process The preparation of the TPE-As was carried out with a laboratory internal mixer (Rheocord 90, Rheomix 600 E mixing chamber, Haake) with tangential rotors, compressed air cooling and a chamber volume of 350 cm$^3$. Mixing was carried out at a speed of 100 rpm, an initial chamber temperature of 190° C. and a filling level of 70%. Mixtures having a rubber microgel/thermoplastic ratio of 70/30 were prepared (samples 1 and 2). For this, the thermoplastic (Grilamid L 1120 G) was first introduced into the mixture and melted in the course of 4 min. The microgel was then metered in, the plunger was closed and the components were mixed for 8 min. An increase in temperature took place during this procedure (samples 1 and 2: $T_{max}$=251° C.). The torque passed through a maximum. After the mixing, optically and physically homogeneous samples which had approximately the colour of the microgel were removed. This material was then granulated.

A conventional TPE-A (sample 5) which had the same rubber/thermoplastic ratio was prepared as a reference for the microgel-based TPE-As according to the invention. The PA employed carries the name (Grilamid L 1120 G) from EMS-GRIVORY and the nitrile rubber employed carries the name (Perbunan NT 3465) from BAYER AG. The crosslinking agent employed is a dicumyl peroxide. It carries the name Poly-Dispersion E(DIC)D-40 from Rhein Chemie Corporation. It is a 40% strength mixture of DCP in an EPM binder. 5 phr of the chemical were metered in. Mixing of these TPE-As was carried out in the same mixer, but an initial temperature of 180° C., a rotor speed of 75 rpm and a total mixing time of 12 min were chosen. The Grilamid L 1120 G was first initially introduced (63.4 g). After melting thereof, the NBR rubber (Perbunan NT 3465 (149 g) and the crosslinking agent Poly-Dispersion E(DIC)D-40 (18.6 g) were metered in successively and the plunger was closed. After the mixing, optically and physically homogeneous samples were removed. This material was then granulated. The morphology obtained is shown in FIG. 3 a). In FIG. 3 b), after addition of the NBR rubber (Perbunan NT 3465) 5 phr of the phase mediator trans-polyoctenamer (Vestenamer 8012 from Degussa AG) were additionally metered into the internal mixer before the crosslinking agent was added.

Pure PA (Grilamid L 1120 G (sample 3)) and pure NBR vulcanization product (Perbunan NT 3465 crosslinked with 5 phr Poly-Dispersion E(DIC)D-40 (sample 4)) are used as a further reference for the microgel-based TPE-As according to the invention.

Injection Moulding

Bars were injection-moulded from the granules of the TPE-As and the pure thermoplastics. This was carried out with a laboratory injection moulding machine (Injektometer, Göttfert) at a machine temperature of 230-240° C., under a pressure of 10 bar and at a mould temperature of 120° C. The dwell time of the sample in the machine and in the mould was about one minute.

Production of the Test Specimens

S2 standard bars are prepared from all the samples. This is carried out by milling in the case of the pure thermoplastic materials (specimen 3). The standard bars of all the other specimens are stamped out. All the prepared standard bars have a width of only 10 mm in the head region, since the injection-moulded blanks have a diameter of only 10 mm. The thickness of the standard bars is 4 mm.

Physical Testing

Tensile Test

The tensile test on the specimens is carried out on S2 standard bars (see above) in accordance with DIN 53504. Testing is carried out with a universal testing machine (model 1445, Zwick) with optical length recorders. The measurement range of the force transducer is 0-2,000 N. The results of the measurements are summarized in Table 1.

The elongation at break and stress at break values of the microgel/PA-based TPE-As are between the values of the pure constituent elastomer and thermoplastic phase. The level of properties of a TPE-A prepared conventionally with the same polymers (sample 5) can be achieved. When the microgel OBR1102C (Preparation Example 1) with the high ACN content is used, the stronger TPE-A is produced.

Swelling

The swelling of the samples is carried out on S2 standard bars (see above) in accordance with DIN 53521 at a temperature of 125° C. over a duration of 4 d in the reference test liquid IRM 903 (industry reference material, highly hydrotreated heavy naphthene distillate). At the end of the exposure time, the test specimens are conditioned by storage in unused test agent at 23° C. in the course of 30 min.

The analytical results of the swelling in oil are summarized in Table 6. The swelling of the microgel/PA-based TPE-As in oil is very low. The swelling resistance of a TPE-A prepared conventionally with the same polymers (PA (Grilamid L 1120 G) from EMS-GRIVORY and (Perbunan NT 3465) from BAYER AG) (sample 5) is exceeded by far. When the microgel OBR1102C with the high ACN content is used, the lower swelling in oil is found.

TABLE 6

Analytical results of the physical testing of the PA specimens

| Specimen no. | Material | $\sigma_B$ Mpa | $\epsilon_B$ % | $\sigma_{max}$ MPa | $\epsilon$ at $\sigma_{max}$ % | Volume swelling vol. % | Weight swelling wt. % |
|---|---|---|---|---|---|---|---|
| 1 | OBR1102B/PA | 17.7 | 136.5 | 17.7 | 136.5 | 2.3 | 1.9 |
| 2 | OBR1102C/PA | 18.5 | 110.2 | 18.5 | 110.2 | 1.6 | 1.3 |
| 3 | PA (Grilamid L 1120 G) | 28.4 | 81.5 | 43 | 7.7 | 0.9 | 0.5 |
| 4 | NBR (Perbunan NT 3465) | 3.8 | 434.7 | 3.8 | 434.7 | 13.7 | 12.7 |
| 5 | NBR/PA (Grilamid L 1120 G)/ (Perbunan NT 3465) | 14.1 | 149.7 | 14.1 | 149.7 | 11 | 10 |

BRIEF DESCRIPTION OF THE DRAWINGS

FIGS. 3(*a*) and (*b*) illustrate an AFM image of a dynamically vulcanized TPV from Example 5.

Figure 1:
FIG. 1 illustrates an image of the composition according to Example 4.
Figure 2:
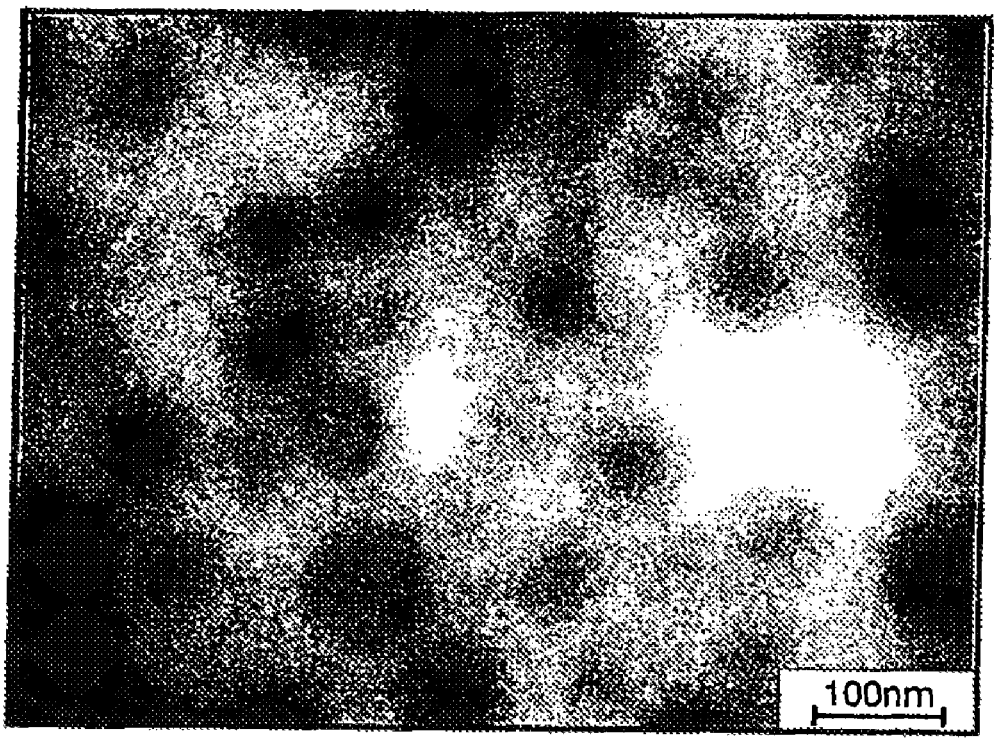
FIG. 2 illustrates an image of the composition according to Example 1.
Figure 4:
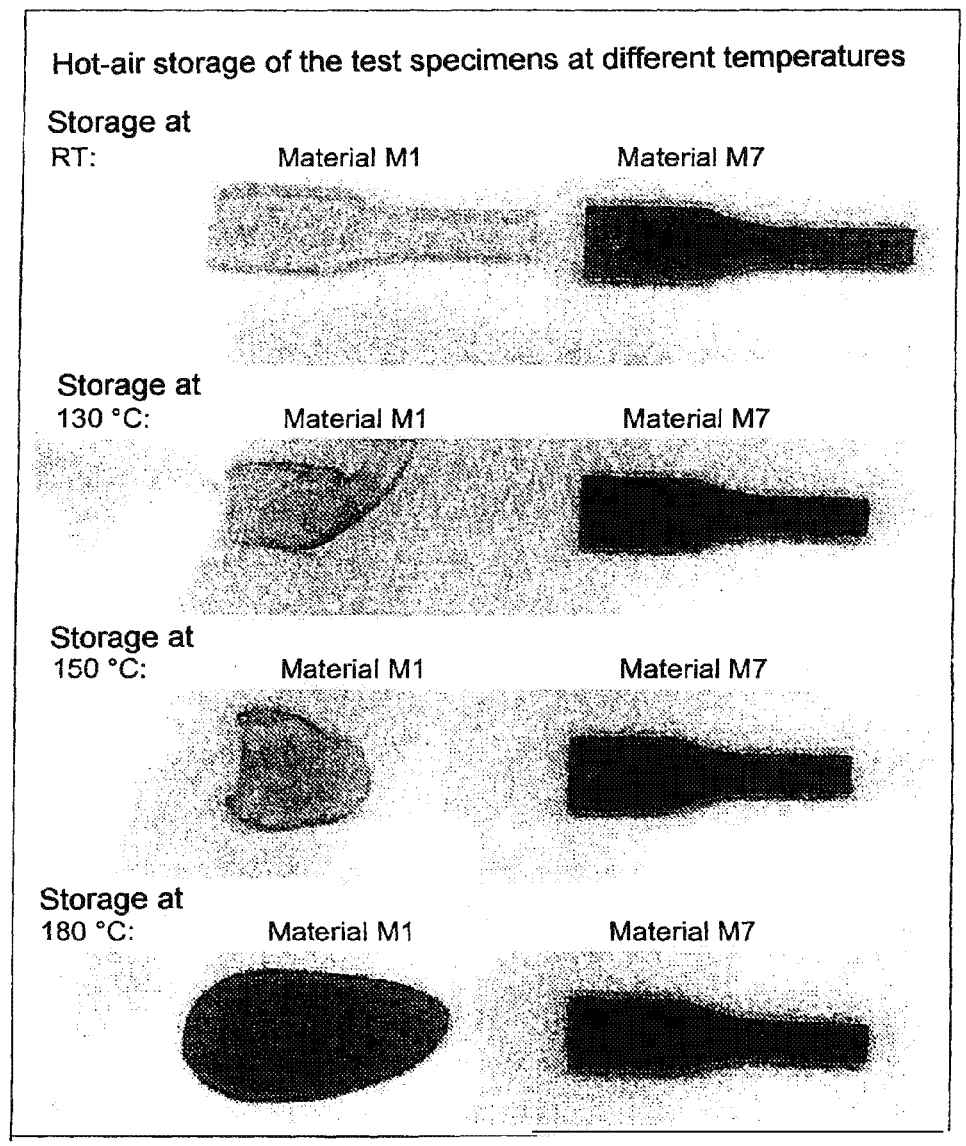
FIG. 4 illustrates hot air storage of the test specimens at different temperature.

What is claimed is:

1. A thermoplastic elastomer composition comprising:
   at least one thermoplastic material (A) chosen from the group consisting of polyether/polyamide block copolymers (TPE-A), polyamide 4, polyamide 66, polyamide 69, polyamide 610, polyamide 11, polyamide 12, polyamide 612, and polyamide MXD6; and
   at least one microgel (B), wherein said microgel (B) is based on homopolymers or random copolymers based on rubber particles chosen from polybutadiene/acrylonitrile copolymers (NBR), and is not crosslinked by high-energy radiation, and comprises primary particles having an average particle size of 30 to 300 nm.

2. The thermoplastic elastomer composition according to claim 1, wherein the primary particles of the microgel (B) have an approximately spherical geometry.

3. The thermoplastic elastomer composition according to claim 1, wherein a deviation of the diameters of an individual primary particles of the microgel (B) is less than 250%, said deviation is defined as

[(d1−d2)/d2]×100%, wherein d1 and d2 are any two desired diameters of any desired section of the primary particle and d1 is >d2.

4. The thermoplastic elastomer composition according to claim 3, wherein said deviation is less than 50%.

5. The thermoplastic elastomer composition according to claim 1, wherein the primary particles have an average particle size of 5 to 500 nm.

6. The thermoplastic elastomer composition according to claim 1, wherein the primary particles have an average particle size of less than 99 nm.

7. The thermoplastic elastomer composition according to claim 1, wherein the microgel (B) has a content which is insoluble in toluene at 23° C. of at least about 70 wt. %.

8. The thermoplastic elastomer composition according to claim 1, wherein the microgel (B) has a swelling index in toluene at 23° C. of less than about 80.

9. The thermoplastic elastomer composition according to claim 1, wherein the microgel (B) has a glass transition temperature of −100° C. to +50° C.

10. The thermoplastic elastomer composition according to claim 1, wherein the microgel (B) has a width of the glass transition range of greater than about 5° C.

11. The thermoplastic elastomer composition according to claim 1, wherein the microgel (B) is obtainable by emulsion polymerization.

12. The thermoplastic elastomer composition according to claim 1, wherein the thermoplastic material (A) has a Vicat softening temperature of at least 50° C.

13. The thermoplastic elastomer composition according to claim 1, wherein a difference in glass transition temperature between the thermoplastic material (A) and the microgel (B) is between 0 and 250° C.

14. The thermoplastic elastomer composition according to claim 1, wherein the weight ratio of thermoplastic material (A) to microgel (B) is from 1:99 to 99:1.

15. The thermoplastic elastomer composition according to claim 1, wherein the weight ratio of thermoplastic material (A) to microgel (B) is from 10:90 to 90:10.

16. The thermoplastic elastomer composition according to claim 1, further comprising at least one conventional plastics additive.

17. The thermoplastic elastomer composition according to claim 1, obtained by mixing the least one thermoplastic material (A) and the at least one microgel (B).

18. The thermoplastic elastomer composition according to claim 1, wherein the microgel (B) comprises functional groups.

19. A process for the preparation of a thermoplastic elastomer composition comprising:
   mixing at least one thermoplastic material (A) chosen from the group consisting of polyether/polyamide block copolymers (TPE-A), polyamide 4, polyamide 66, polyamide 69, polyamide 610, polyamide 11, polyamide 12, polyamide 612, and polyamide MXD6 with
   at least one microgel (B), wherein said microgel (B) is based on homopolymers or random copolymers based on rubber particles chosen from polybutadiene/acrylonitrile copolymers (NBR), and is not crosslinked by high-energy radiation, and comprises primary particles having an average particle size of 30 to 300 nm.

20. The process according to claim 19, wherein the microgel (B) is prepared before said mixing with the thermoplastic material (A).

21. A thermoplastic elastomer composition obtained by the process according to claim 19 or 20.

22. A process for incorporation into further thermoplastic materials of the thermoplastic elastomer composition according to claim 1, comprising:
adding the thermoplastic elastomer composition according to claim 1 as a masterbatch to the further thermoplastic materials.

23. A process for the production of thermoplastically processable shaped articles, comprising:
providing the thermoplastic elastomer composition according to claim 1 for shaping.

24. Shaped articles obtained by shaping the thermoplastic elastomer composition according to claim 1.

25. The thermoplastic elastomer composition according to claim 1, wherein the weight ratio of thermoplastic material (A) to microgel (B) is from 20:80 to 80:20.

* * * * *